United States Patent
Tomes et al.

(10) Patent No.: US 12,503,961 B1
(45) Date of Patent: Dec. 23, 2025

(54) SLIP BASED RADIAL BEARING SUPPORT

(71) Applicant: Pratt & Whitney Canada Corp., Longueuil (CA)

(72) Inventors: Nathan Tomes, Hamilton (CA); Tyler Richardson, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/749,190

(22) Filed: Jun. 20, 2024

(51) Int. Cl.
 *F01D 25/16* (2006.01)

(52) U.S. Cl.
 CPC ........ *F01D 25/164* (2013.01); *F05D 2240/54* (2013.01); *F05D 2260/96* (2013.01)

(58) Field of Classification Search
 CPC .... F01D 21/045; F01D 25/162; F01D 25/164; F01D 21/04; F01D 21/08; F01D 25/16; F16C 2360/23; F16C 27/04; F16C 19/06; F16C 19/52; F16C 19/522; F16C 35/067; F16C 33/586; F16C 17/20; F16C 19/26; F16C 19/527; F16C 19/54; F16C 25/083; F16C 35/02; F16C 35/042; F16C 35/045; F16C 35/06; F16C 35/063; F05B 2260/3011; F02C 7/06; F05D 2220/36; F05D 2260/311; F05D 2300/505; F05D 2240/50; F05D 2240/54; F05D 2260/96; F04D 29/056; F04D 27/0292; F04D 29/059; F04D 29/668
 See application file for complete search history.

(56) References Cited

U.S. PATENT DOCUMENTS

| | | | |
|---|---|---|---|
| 6,079,200 A | | 6/2000 | Tubbs |
| 6,109,022 A | * | 8/2000 | Allen ....................... F01D 5/28 60/226.1 |
| 8,430,622 B2 | | 4/2013 | Webster et al. |
| 9,777,596 B2 | * | 10/2017 | Raykowski ........... F16C 33/586 |
| 10,274,017 B2 | | 4/2019 | Ganiger et al. |
| 10,634,007 B2 | * | 4/2020 | Ghosh ................... F16C 35/063 |
| 11,702,993 B2 | | 7/2023 | Buchholz |
| 2020/0157971 A1 | | 5/2020 | Buchholz et al. |

FOREIGN PATENT DOCUMENTS

| | | |
|---|---|---|
| CA | 2471665 A1 | 12/2004 |
| EP | 1659266 A1 | 5/2006 |

OTHER PUBLICATIONS

Extended European Search Report for EP Application No. 25183983.3, dated Oct. 30, 2025, pp. 1-6.

* cited by examiner

*Primary Examiner* — Eric J Zamora Alvarez

(74) *Attorney, Agent, or Firm* — CANTOR COLBURN LLP

(57) ABSTRACT

A bearing arrangement of a gas turbine engine includes a first bearing and a second bearing axially offset from the first bearing. A first bearing support extends from a bearing housing to the first bearing to support the first bearing, and a second bearing support extends from the bearing housing to the second bearing to support the second bearing. One or more radial bearing supports including a plurality of radial spokes extend between the bearing housing and the second bearing. Each spoke extends from a spoke base to a spoke tip. A raised pedestal is positioned at a contact point of each spoke tip, and at least one destabilizer is secured to the second bearing and is configured to contact at least one radial spoke when the predetermined threshold is exceeded to initiate sliding of the plurality of radial spokes from their respective raised pedestal.

20 Claims, 7 Drawing Sheets

SLIP BASED RADIAL BEARING SUPPORT

BACKGROUND

Exemplary embodiments pertain to the art of turbomachinery such as gas turbine engines. In particular, the present disclosure relates to bearing assemblies and support of bearing assemblies of gas turbine engines.

During a fan blade off event (FBO), some designs require that two bearings on the engine be broken to help limit the load and vibrations transferred from the rotor to the engine and aircraft structure caused by the unbalance resulting from the FBO.

A typical bearing support 200 configuration is illustrated in FIG. 12 A first bearing 202 is a roller bearing supporting radial loads, and requires low support stiffness and is broken by buckling of a first bearing support 204. A second bearing 206 is a ball bearing, supportive of axial and radial loads. The second bearing 206 requires high support stiffness and is broken by fracturing bolts 210 between the second bearing 206 and a second bearing support 208. Configuring the bolts 210 to always break at FBO, requiring high stress, but to not yield at limit loads or during installation and have a full low-cycle fatigue life, all requiring low stress, is very difficult.

BRIEF DESCRIPTION

In one exemplary embodiment, a bearing arrangement of a gas turbine engine includes a first bearing supportive of a shaft, and a second bearing axially offset from the first bearing and supportive of the shaft. A first bearing support extends from a bearing housing to the first bearing to support the first bearing, and a second bearing support extends from the bearing housing to the second bearing to support the second bearing. One or more radial bearing supports including a plurality of radial spokes extend between the bearing housing and the second bearing. Each spoke extends from a spoke base to a spoke tip. A raised pedestal is positioned at a contact point of each spoke tip, and at least one destabilizer is secured to the second bearing and is configured to contact at least one radial spoke of the plurality of radial spokes when the predetermined threshold is exceeded to initiate sliding of the plurality of radial spokes from their respective raised pedestal.

Additionally or alternatively, in this or other embodiments the radial bearing support includes an outer ring positioned at the bearing housing, and the plurality of radial spokes extend from the spoke base secured to the outer ring to the spoke tip at the second bearing.

Additionally or alternatively, in this or other embodiments the raised pedestal extends radially outwardly from a bearing outer race of the second bearing.

Additionally or alternatively, in this or other embodiments a secondary pedestal extends radially outwardly from the bearing outer race defining a channel between the raised pedestal and the secondary pedestal.

Additionally or alternatively, in this or other embodiments the destabilizer is configured to contact the radial spokes in an axial direction in response to a tilt displacement of the second bearing.

Additionally or alternatively, in this or other embodiments the destabilizer is configured to contact the plurality of radial spokes at a point closer to the second bearing than to the spoke base.

Additionally or alternatively, in this or other embodiments the radial bearing support includes an inner ring surrounding the second bearing, and the plurality of radial spokes extend radially outwardly from the spoke base connected to the inner ring to the spoke tip.

Additionally or alternatively, in this or other embodiments the contact point is defined between the spoke tip and a bumper extending radially inwardly from the bearing housing.

Additionally or alternatively, in this or other embodiments the destabilizer is configured to contact the plurality of radial spokes at a point closer to the bumper than to the second bearing.

Additionally or alternatively, in this or other embodiments a roller element is positioned at the contact point.

In another exemplary embodiment, a gas turbine engine includes a combustor, a turbine driven by combustion products of the combustor, a shaft driven by rotation of the turbine, and a bearing arrangement supportive of the shaft. The bearing arrangement includes a first bearing and a second bearing axially offset from the first bearing. A first bearing support extends from a bearing housing to the first bearing to support the first bearing, and a second bearing support extends from the bearing housing to the second bearing to support the second bearing. One or more radial bearing supports includes a plurality of radial spokes extending between the bearing housing and the second bearing. Each spoke extends from a spoke base to a spoke tip. A raised pedestal is positioned at a contact point of each spoke tip. At least one destabilizer is secured to the second bearing and is configured to contact at least one radial spoke of the plurality of radial spokes when the predetermined threshold is exceeded to initiate sliding of the at least one radial spoke from its respective raised pedestal.

Additionally or alternatively, in this or other embodiments the radial bearing support includes an outer ring positioned at the bearing housing, and the plurality of radial spokes extend from the spoke base secured to the outer ring to the spoke tip at the second bearing.

Additionally or alternatively, in this or other embodiments the raised pedestal extends radially outwardly from a bearing outer race of the second bearing.

Additionally or alternatively, in this or other embodiments a secondary pedestal extends radially outwardly from the bearing outer race defining a channel between the raised pedestal and the secondary pedestal.

Additionally or alternatively, in this or other embodiments the destabilizer is configured to contact the radial spokes in an axial direction in response to a tilt displacement of the second bearing.

Additionally or alternatively, in this or other embodiments the destabilizer is configured to contact the plurality of radial spokes at a point closer to the second bearing than to the spoke base.

Additionally or alternatively, in this or other embodiments the radial bearing support includes an inner ring surrounding the second bearing, and the plurality of radial spokes extend radially outwardly from the spoke base secured to the inner ring to the spoke tip.

Additionally or alternatively, in this or other embodiments the contact point is defined between the spoke tip and a bumper extending radially inwardly from the bearing housing.

Additionally or alternatively, in this or other embodiments the destabilizer is configured to contact the plurality of radial spokes at a point closer to the bumper than to the second bearing.

Additionally or alternatively, in this or other embodiments a roller element is positioned at the contact point.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
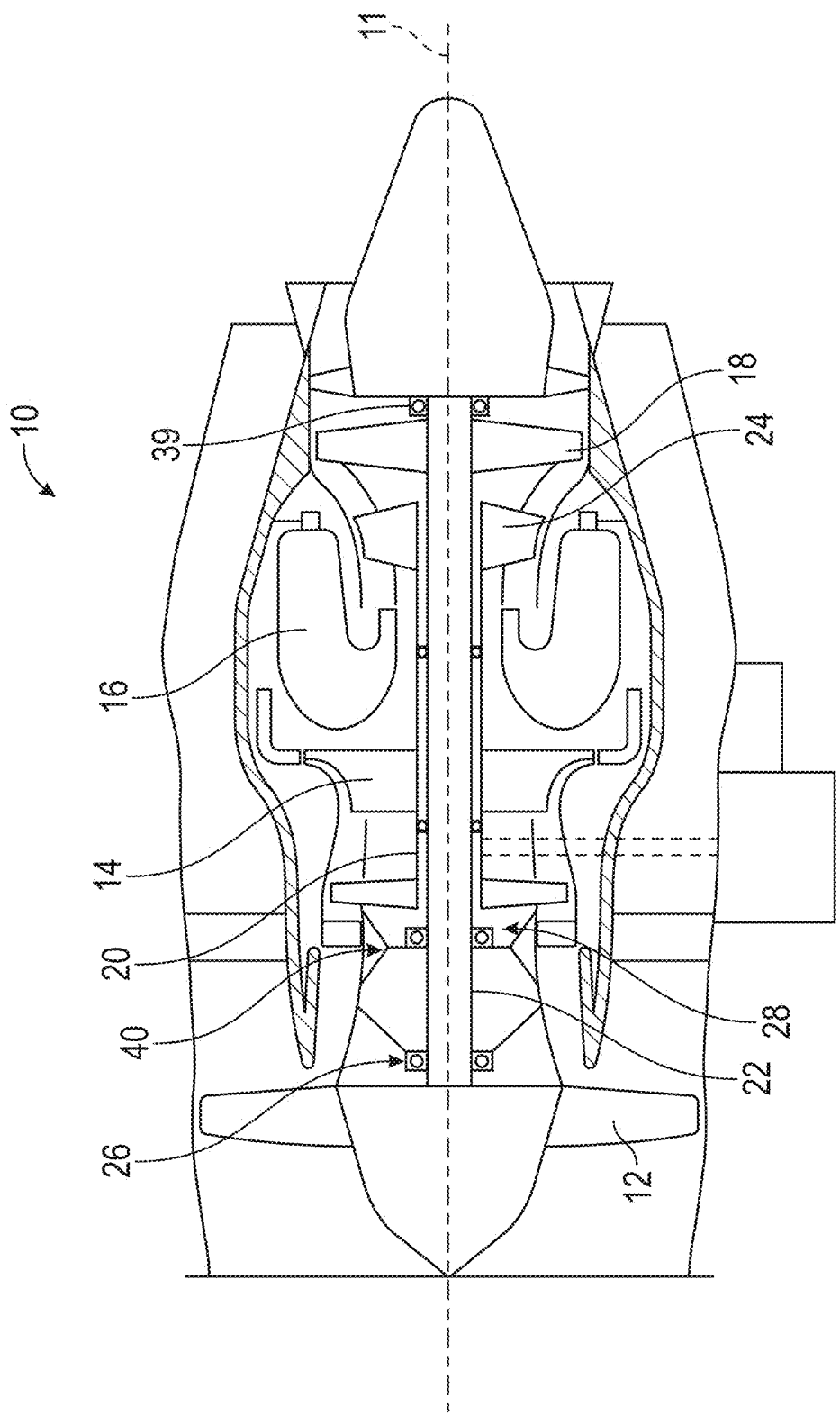
FIG. 1 is a partial cross-sectional view of a gas turbine engine.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third bearing 39 which may be the #5 bearing of the engine (the #3 and #4 bearings rotatably supporting the high pressure shaft 20), The bearing arrangement for a particular engine, including but not limited to the number and type of bearings selected, is typically determined by a number of factors specific to that engine.

The bearing arrangement described herein is exemplary only, and is not intended to be limiting. In this example, the forward and rearward most bearings, i.e. the #1 and #5 bearings, may be roller bearings for radially supporting the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine 10. The bearings and supporting structure flanges may be arranged in any suitable fashion in the context of the present application.

Figure 2:
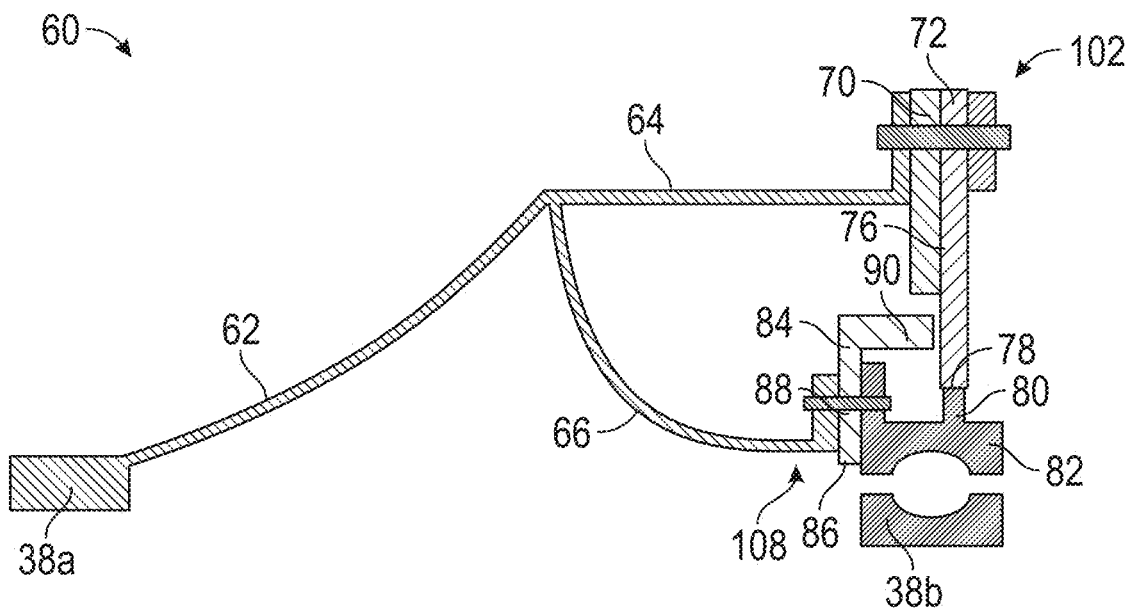
FIG. 2 is a schematic cross-sectional view of an embodiment of a bearing support arrangement of a gas turbine engine.

Referring now to FIG. 2, illustrated is an embodiment of a bearing support arrangement 60. A first bearing 38a, a roller bearing, which is also illustrated in FIG. 1, is supported and positioned by a first bearing support 62, which extends from a bearing housing 64. A second bearing 38b, a ball bearing, which is also illustrated in FIG. 1, is supported by a second bearing support 66, which also extends from the bearing housing 64. The second bearing support 66 must provide sufficiently stiff axial support for the second bearing 38b for rotor stability, but it must not carry significant radial loading. This can be achieved with features like a squirrel cage or hairpin. In some embodiments, the second bearing support 66 can have a shared load path with the first bearing support 62, but this is not required.

A bumper 70 extends from the bearing housing 64 radially inwardly toward the second bearing 38b to limit radial displacement of the second bearing 38b. Additionally, a radial support 72 surrounds the second bearing 38b.

Figure 3:
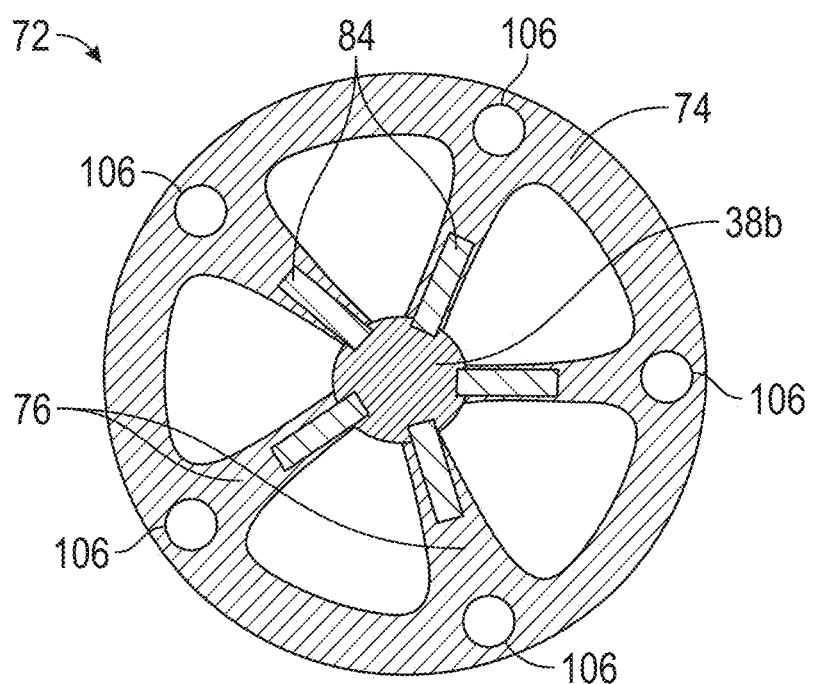
FIG. 3 is a cross-sectional view of an embodiment of a radial support of a bearing arrangement.
Figure 10:
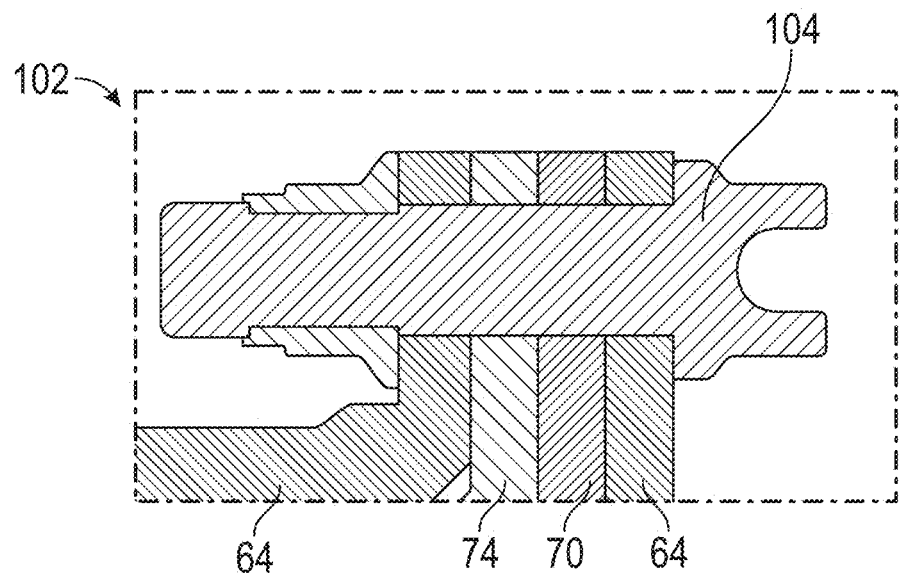
FIG. 10 is a schematic cross-sectional view of an embodiment of an outer flange arrangement.

Referring now to FIG. 3, with continued reference to FIG. 2, an embodiment of the radial support 72 will be described. The radial support 72 includes an outer ring 74 disposed at and secured to the bearing housing 64, and a plurality of radial spokes 76 extending from the outer ring 74 toward the second bearing 38b. The radial spokes 76 each include a spoke tip 78 that rests on a raised pedestal 80 extending radially outwardly from the second bearing 38b and, in particular, from a bearing outer race 82 of the second bearing 38b. In some embodiments, as illustrated in FIG. 10, the outer ring 74 is secured to the bearing housing 64 and the bumper 70 at outer flange arrangement 102 using fasteners 104 extending through fastener openings shown schematically in FIG. 3 as 106.

The spoke tip 78 contacts the raised pedestal 80, but is not secured thereto. In some embodiments, the spoke tip 78 includes an uneven profile, one that is, for example, curvilinear, to both ensure compression on the spoke 76 and to ensure that the radial contact force of the raised pedestal 80 is axially centered on the spoke 76. The spokes 76 are configured such that the spoke tip 78 slips from the raised pedestal 80 during an FBO event while also providing a high radial stiffness during normal operation.

The buckling capacity of the radial support 72 is configured to be greater than ultimate maneuver loads of the aircraft.

Figure 11:
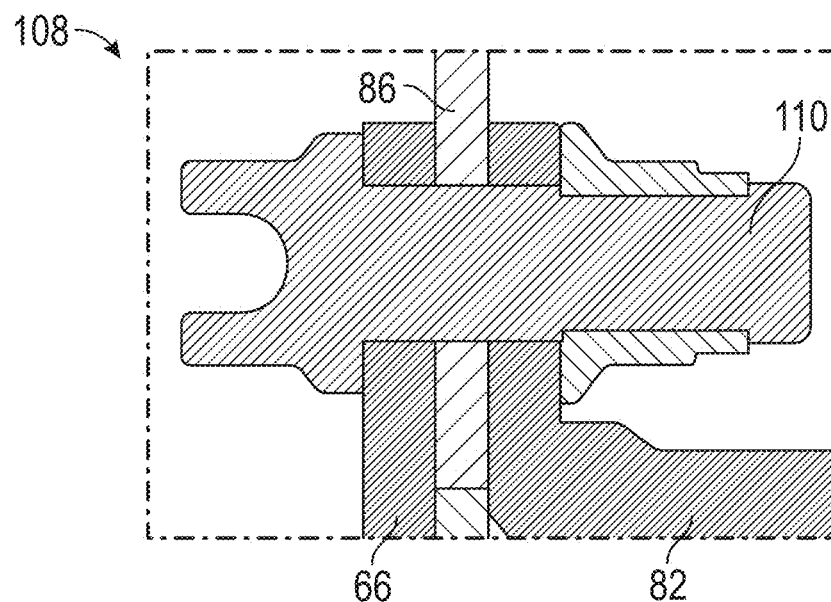
FIG. 11 is a schematic cross-sectional view of an embodiment of an inner flange arrangement.
Figure 12:
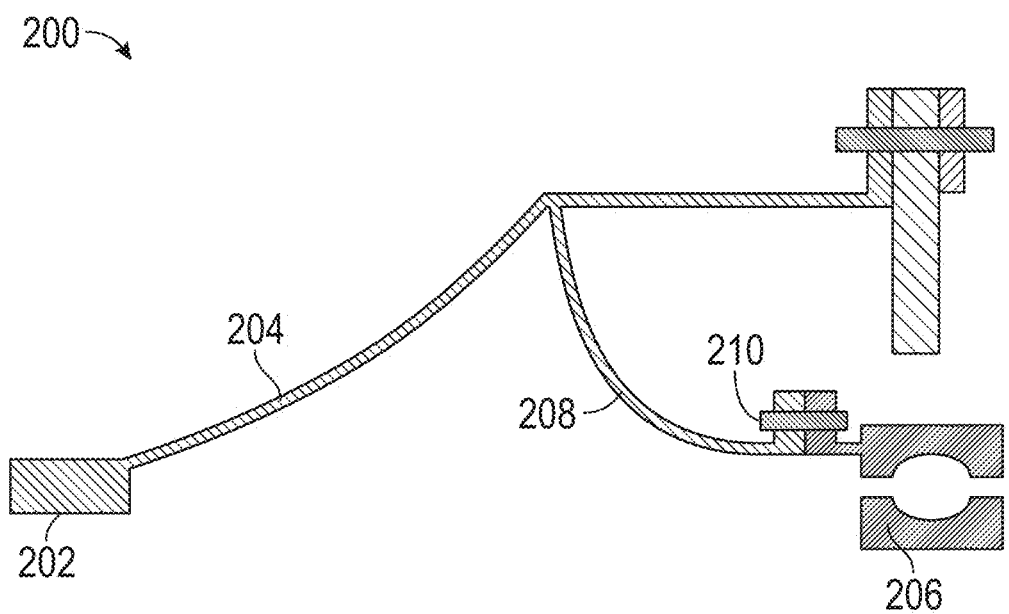
FIG. 12 is a schematic illustration of a previous bearing support arrangement of a gas turbine engine.

The bearing support arrangement 60 further includes a destabilizer 84 secured to the bearing outer race 82, and extending toward the spokes 76. The destabilizer 84 includes a destabilizer base 86 secured to the bearing outer race 82, and a destabilizer arm 88 extending radially outwardly from the bearing outer race 82. A destabilizer finger 90 extends from the destabilizer arm 88 in an axial direction toward the spokes 76. As illustrated in FIG. 3, each destabilizer 84 is circumferentially aligned with a respective spoke 76 of the plurality of spokes 76. In some embodiments, as illustrated in FIG. 11, the second bearing support 66, the destabilizer base 86 and the outer bearing race 82 are secured together via an inner flange arrangement 108 using fasteners 110.

Figure 4:
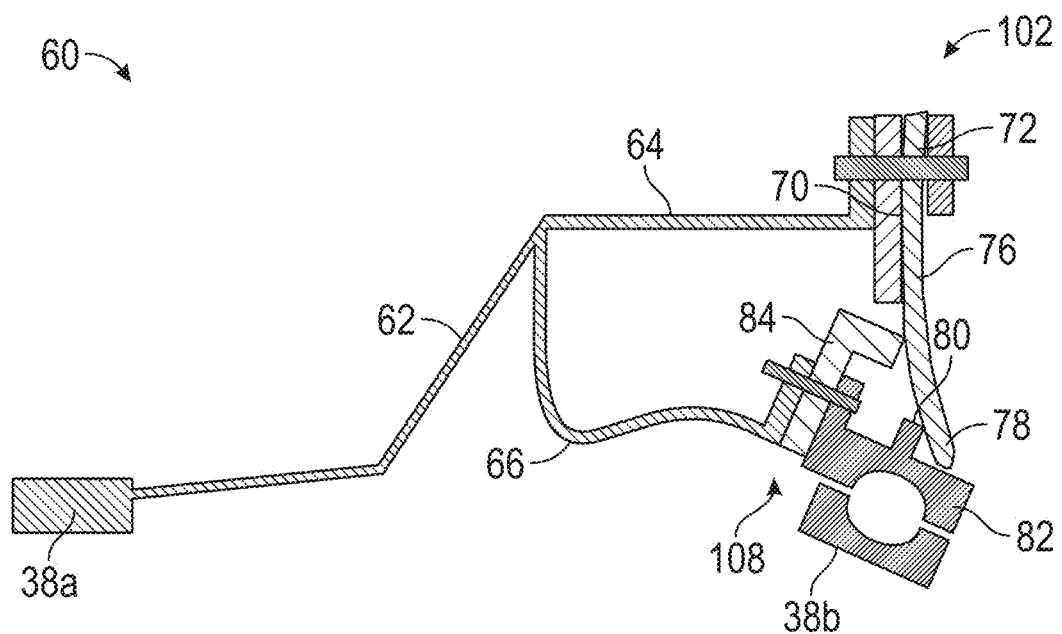
FIG. 4 is a schematic cross-sectional view of the embodiment of FIG. 2 in a fan blade off (FBO) event.

As illustrated in FIG. 4, in an FBO event the first bearing support 62 buckles, allowing the fan to move radially. During subsequent rundown, a fan resonance increases the fan radial displacement significantly, causing the second bearing support 66 to cross-corner and tilt under large radial moments in addition to exerting large radial forces. The second bearing 38b exerts a compressive load onto the plurality of spokes 76, and the destabilizers 84 contact the spokes 76 axially causing the spokes 76 to slip axially off of the raised pedestal 80. After the spokes 76 slip, the destabilizer 84 and the bumper 70 act as the radial support to limit radial travel of the second bearing 38b.

Figure 5:
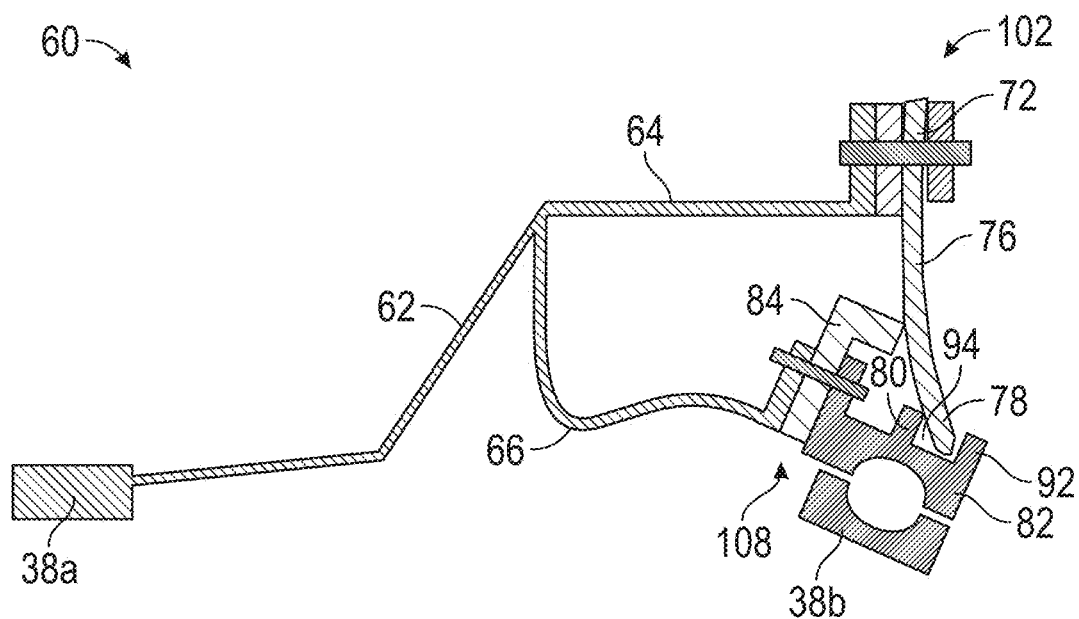
FIG. 5 is a schematic cross-sectional view of another embodiment of a bearing support arrangement of a gas turbine engine in a fan blade off (FBO) event.

A second embodiment is illustrated in FIG. 5, with the configuration illustrated during an FBO event. In this embodiment, in addition to the raised pedestal 80, the bearing outer race 82 includes a secondary pedestal 92 defining a channel 94 between the raised pedestal 80 and the secondary pedestal 92. During an FBO event, when the spokes 76 slip from the raised pedestals 80, the spoke tip 78 moves into the channel 94 and in the event of greater second bearing 38b displacements, is prevented from sliding entirely off of the bearing outer race 82 by the secondary pedestal 92, constraining the radial displacement to a predetermined level.

Figure 6:
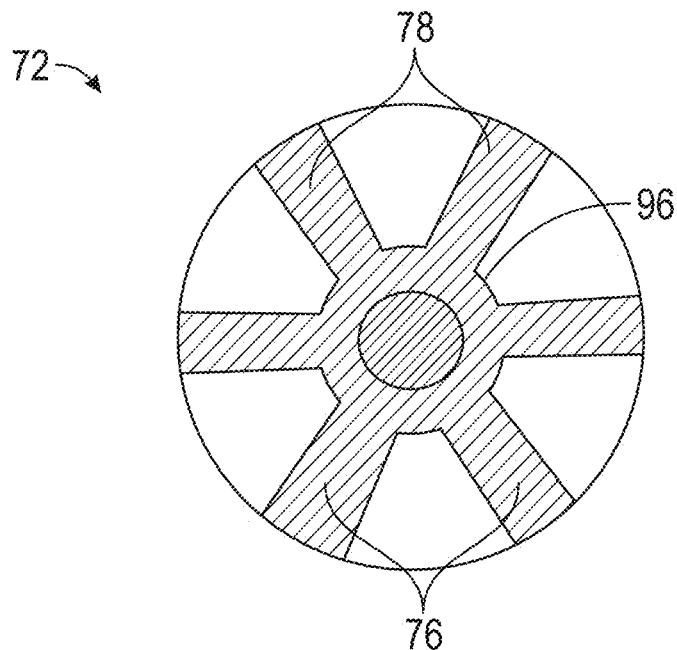
FIG. 6 is a schematic cross-sectional view of another embodiment of a radial support of a bearing arrangement.
Figure 7:
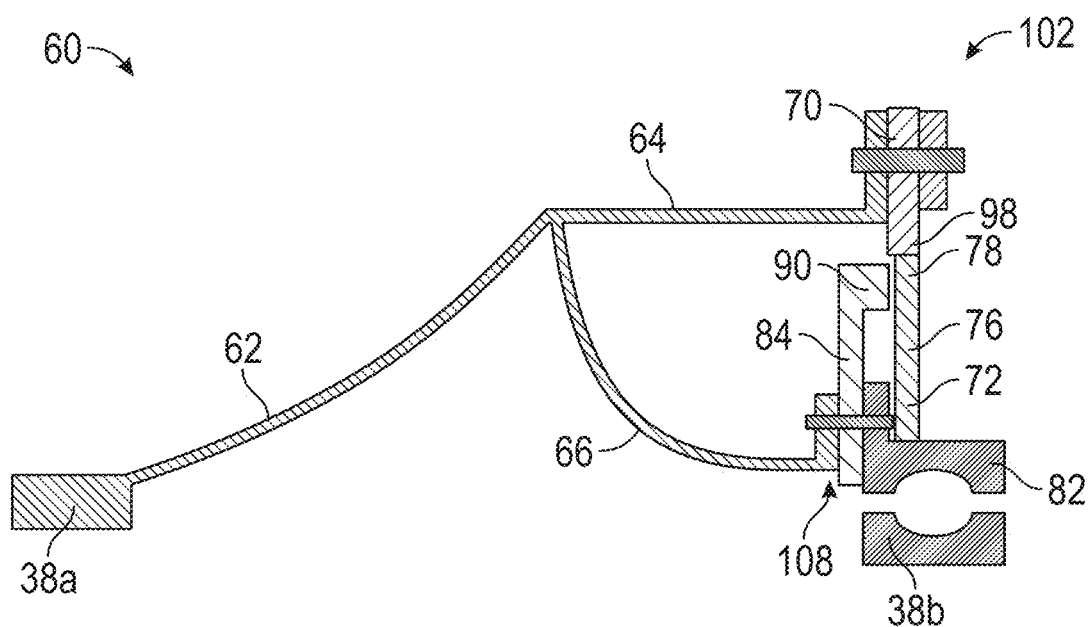
FIG. 7 is a schematic cross-sectional view of yet another embodiment of a bearing support arrangement of a gas turbine engine.
Figure 8:
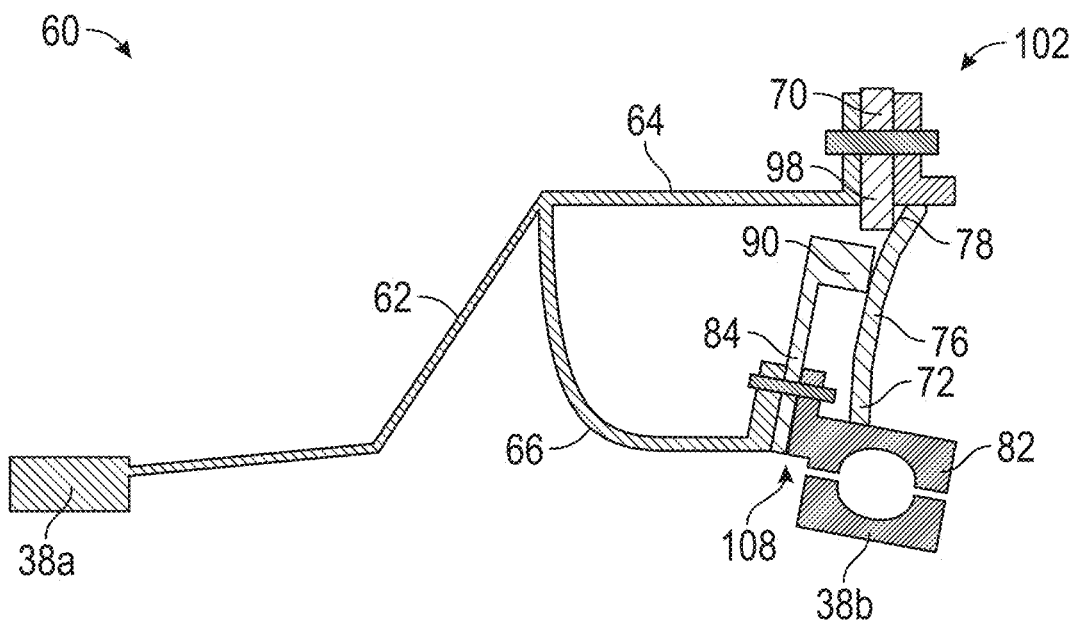
FIG. 8 is a schematic cross-sectional view of the embodiment of FIG. 7 in a fan blade off (FBO) event.

Referring now to FIG. 6, in some embodiments, the radial support 72 includes an inner ring 96 surrounding the second bearing 38b, with the spokes 76 extending radially outwardly toward the bumper 70. In this embodiment, as illustrated in FIG. 7, the spoke tips 78 contact a bumper end 98 of the bumper 70, without being secured thereto. The destabilizer 84 is radially elongated so that the destabilizer finger 90 is configured to contact the spokes 76 at a location nearer to the spoke tip 78 and the bumper 70, than to the inner ring 96. During an FBO event, as illustrated in FIG. 8, when the second bearing 38b tilts, the destabilizer 84 contacts the spoke 76 to initiate the sliding motion of the spokes 76 off of the bumper 70. This increases sensitivity to tilt angle of the second bearing 38b, due to the contact point of the destabilizer 84 with the spoke 76 being at a greater radial distance from the second bearing 38b.

Figure 9:
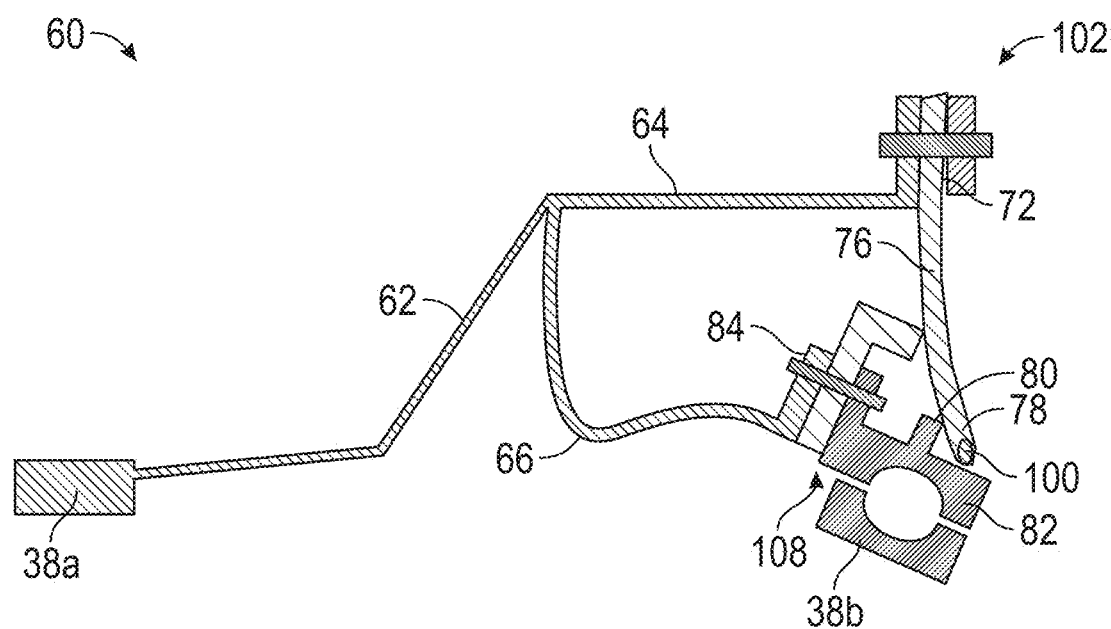
FIG. 9 is a schematic cross-sectional view of still another embodiment od a bearing support arrangement of a gas turbine engine in a fan blade off (FBO) event.

In other embodiments, as illustrated in FIG. 9, a roller element 100 is located at the contact point between the spoke 76 and the raised pedestal 80. The presence of the roller element 100 reduces friction at the contact point, thus lowering the force necessary to initiate the sliding motion of the spokes. In some embodiments, such as shown in FIG. 9, the roller element is disposed on the spoke tip 78. In other embodiments, however, the roller element 100 may be additionally or alternatively positioned on the raised pedestal 80.

The embodiments disclosed herein provide that the two bearings 38a and 38b fail during an FBO event to limit the load and vibrations transferred from the rotor to the engine and aircraft structure caused by the resulting imbalance. The failure of the second bearing 38b is achieved via spoke slip of the second bearing support 72 instead of a fracture-based fuse, thus reducing normal operating stresses and improving low-cycle fatigue (LCF) performance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing arrangement of a gas turbine engine, comprising:
    a first bearing supportive of a shaft;
    a second bearing axially offset from the first bearing and supportive of the shaft;
    a first bearing support extending from a bearing housing to the first bearing to support the first bearing;
    a second bearing support extending from the bearing housing to the second bearing to support the second bearing;
    one or more radial bearing supports including a plurality of radial spokes extending between the bearing housing and the second bearing, each spoke extending from a spoke base to a spoke tip;
    a raised pedestal disposed at a contact point of each spoke tip; and
    at least one destabilizer secured to the second bearing and configured to contact at least one radial spoke of the plurality of radial spokes when a displacement of the second bearing exceeds a predetermined threshold to initiate sliding of the plurality of radial spokes with respect to a corresponding raised pedestal.

2. The bearing arrangement of claim 1, wherein the one or more radial bearing supports includes an outer ring disposed at the bearing housing, and the plurality of radial spokes extending from the spoke base secured to the outer ring to the spoke tip at the second bearing.

3. The bearing arrangement of claim 2, wherein each raised pedestal extends radially outwardly from a bearing outer race of the second bearing.

4. The bearing arrangement of claim 3, further comprising a secondary pedestal extending radially outwardly from the bearing outer race defining a channel between each raised pedestal and the secondary pedestal.

5. The bearing arrangement of claim 1, wherein the destabilizer is configured to contact the plurality of radial spokes in an axial direction in response to a tilt displacement of the second bearing.

6. The bearing arrangement of claim 5, wherein the destabilizer is configured to contact the plurality of radial spokes at a point closer to the second bearing than to the spoke base.

7. The bearing arrangement of claim 1, wherein the one or more radial bearing supports includes an inner ring surrounding the second bearing, and the plurality of radial spokes extend radially outwardly from the spoke base connected to the inner ring to the spoke tip.

8. The bearing arrangement of claim 7, wherein the contact point is defined between the spoke tip and a bumper extending radially inwardly from the bearing housing.

9. The bearing arrangement of claim 8, wherein the destabilizer is configured to contact the plurality of radial spokes at a point closer to the bumper than to the second bearing.

10. The bearing arrangement of claim 1, further comprising a roller element disposed at the contact point.

11. A gas turbine engine, comprising:
a combustor;
a turbine driven by combustion products of the combustor;
a shaft driven by rotation of the turbine; and
a bearing arrangement supportive of the shaft, the bearing arrangement including:
a first bearing;
a second bearing axially offset from the first bearing;
a first bearing support extending from a bearing housing to the first bearing to support the first bearing;
a second bearing support extending from the bearing housing to the second bearing to support the second bearing;
one or more radial bearing supports including a plurality of radial spokes extending between the bearing housing and the second bearing, each spoke extending from a spoke base to a spoke tip;
a raised pedestal disposed at a contact point of each spoke tip; and
at least one destabilizer secured to the second bearing and configured to contact at least one radial spoke of the plurality of radial spokes when a displacement of the second bearing exceeds a predetermined threshold to initiate sliding of the plurality of radial spokes with respect to a corresponding raised pedestal.

12. The gas turbine engine of claim 11, wherein the one or more radial bearing supports includes an outer ring disposed at the bearing housing, and the plurality of radial spokes extend from the spoke base secured to the outer ring to the spoke tip at the second bearing.

13. The gas turbine engine of claim 12, wherein each raised pedestal extends radially outwardly from a bearing outer race of the second bearing.

14. The gas turbine engine of claim 13, further comprising a secondary pedestal extending radially outwardly from the bearing outer race defining a channel between each raised pedestal and the secondary pedestal.

15. The gas turbine engine of claim 11, wherein the destabilizer is configured to contact the plurality of radial spokes in an axial direction in response to a tilt displacement of the second bearing.

16. The gas turbine engine of claim 15, wherein the destabilizer is configured to contact the plurality of radial spokes at a point closer to the second bearing than to the spoke base.

17. The gas turbine engine of claim 11, wherein the one or more radial bearing supports includes an inner ring surrounding the second bearing, and the plurality of radial spokes extend radially outwardly from the spoke base secured to the inner ring to the spoke tip.

18. The gas turbine engine of claim 17, wherein the contact point is defined between the spoke tip and a bumper extending radially inwardly from the bearing housing.

19. The gas turbine engine of claim 18, wherein the destabilizer is configured to contact the plurality of radial spokes at a point closer to the bumper than to the second bearing.

20. The gas turbine engine of claim 11, further comprising a roller element disposed at the contact point.

* * * * *